United States Patent
Kreidler et al.

(10) Patent No.: US 11,293,444 B2
(45) Date of Patent: Apr. 5, 2022

(54) PUMP ASSEMBLY HAVING AN AXIAL FLUX ELECTRIC MOTOR

(71) Applicants: Regal Beloit America, Inc., Beloit, WI (US); Regal Beloit Australia Pty, Ltd., Rowville (AU)

(72) Inventors: Jason Jon Kreidler, Sheboygan, WI (US); Samuel Augustin Dieckhaus, Milwaukee, WI (US); Alexander Julian Baer, Brighton (AU)

(73) Assignees: REGAL BELOIT AMERICA, INC., Beloit, WI (US); REGAL BELOIT AUSTRALIA PTY LTD., Rowville (AU)

( * ) Notice: Subject to any disclaimer, the term of this patent is extended or adjusted under 35 U.S.C. 154(b) by 254 days.

(21) Appl. No.: 16/439,039

(22) Filed: Jun. 12, 2019

(65) Prior Publication Data
US 2019/0383292 A1 Dec. 19, 2019

Related U.S. Application Data

(60) Provisional application No. 62/685,095, filed on Jun. 14, 2018.

(51) Int. Cl.
*F04D 13/06* (2006.01)
*F04D 29/048* (2006.01)
(Continued)

(52) U.S. Cl.
CPC ......... *F04D 13/06* (2013.01); *F04D 13/0666* (2013.01); *F04D 29/043* (2013.01);
(Continued)

(58) Field of Classification Search
CPC .. F04D 13/06; F04D 13/0666; F04D 29/5806; F04D 29/043; F04D 29/048;
(Continued)

(56) References Cited

U.S. PATENT DOCUMENTS

| 5,044,897 A | 9/1991 | Dorman |
| 9,989,065 B2 | 6/2018 | Kamrath |

(Continued)

FOREIGN PATENT DOCUMENTS

| DE | 102011119625 A1 * | 5/2013 | ......... F04D 29/5806 |
| EP | 2072828 B1 | 3/2018 | |

(Continued)

OTHER PUBLICATIONS

DE102011119625 translation (Year: 2021).*

*Primary Examiner* — Kenneth J Hansen
*Assistant Examiner* — David N Brandt
(74) *Attorney, Agent, or Firm* — Armstrong Teasdale LLP

(57) ABSTRACT

A pump assembly includes a pump housing having a fluid inlet, a fluid outlet, and a fluid channel defined therebetween. The pump assembly also includes an impeller positioned within the fluid channel and configured to channel a fluid between the fluid inlet and the fluid outlet. The pump assembly also includes a motor assembly having a shaft coupled to the rear plate, wherein the shaft defines a first fluid cavity coupled in flow communication with an opening in the rear plate to enable fluid flow into the shaft. The motor assembly also includes a motor housing having a back plate positioned relative to the impeller rear plate to define a second fluid cavity therebetween. The motor assembly further includes a stator assembly coupled to the back plate and positioned opposite the second fluid cavity such that the fluid facilitates cooling the stator assembly.

17 Claims, 2 Drawing Sheets

(51) Int. Cl.
*H02K 5/15* (2006.01)
*F04D 29/58* (2006.01)
*F04D 29/043* (2006.01)
*H02K 5/20* (2006.01)
*F04D 1/00* (2006.01)

(52) U.S. Cl.
CPC ....... *F04D 29/048* (2013.01); *F04D 29/5806* (2013.01); *H02K 5/15* (2013.01); *F04D 1/00* (2013.01); *F05D 2240/61* (2013.01); *H02K 5/20* (2013.01)

(58) Field of Classification Search
CPC .. F04D 1/00; F04D 13/14; H02K 5/15; H02K 5/12; H02K 5/24; H02K 5/20; F05D 2240/61
See application file for complete search history.

(56) References Cited

U.S. PATENT DOCUMENTS

| | | |
|---|---|---|
| 2004/0119374 A1 | 6/2004 | Carl et al. |
| 2008/0019850 A1* | 1/2008 | Tajima ..................... H02K 5/12 |
| | | 417/410.1 |
| 2016/0072362 A1 | 3/2016 | Kube |
| 2016/0177962 A1* | 6/2016 | Laing ................. F04D 29/0473 |
| | | 417/423.13 |
| 2017/0159661 A1 | 6/2017 | Gieras et al. |
| 2018/0145574 A1 | 5/2018 | McCaw |
| 2018/0245596 A1 | 8/2018 | Van Steenburg et al. |

FOREIGN PATENT DOCUMENTS

| | | |
|---|---|---|
| EP | 3337970 A1 | 6/2018 |
| WO | 2013107808 A2 | 7/2013 |

* cited by examiner

PUMP ASSEMBLY HAVING AN AXIAL FLUX ELECTRIC MOTOR

CROSS-REFERENCE TO RELATED APPLICATIONS

This application is a non-provisional of U.S. Provisional Patent Application No. 62/685,095 filed Jun. 14, 2018, the contents of which are hereby incorporated by reference in its entirety.

BACKGROUND

The field of the disclosure relates generally to centrifugal pump assemblies, and more specifically, to centrifugal pump assemblies that include an axial flux electric motor coupled to an impeller.

At least some known centrifugal pumps include an impeller for channeling a fluid through the pump. The impeller is coupled to a shaft that is also coupled to a rotor of an electric motor such that rotation of the rotor causes rotation of the impeller. In at least some centrifugal pumps, the stator of the electric motor generates a relatively high amount of heat and may require a complex and high cost cooling system. Additionally, in at least some centrifugal pumps, servicing the bearing or sealing assemblies requires removal of the entire motor from the pump.

BRIEF DESCRIPTION

In one aspect, a pump assembly is provided. The pump assembly includes a pump housing having a fluid inlet, a fluid outlet, and a fluid channel defined therebetween. The pump assembly also includes an impeller positioned within the fluid channel and configured to channel a fluid between the fluid inlet and the fluid outlet. The impeller includes a rear plate having an opening defined therein. The pump assembly also includes a motor assembly having a shaft coupled to the rear plate, wherein the shaft defines a first fluid cavity coupled in flow communication with the opening to enable fluid flow into the shaft. The motor assembly also includes a motor housing having a back plate positioned relative to the impeller rear plate to define a second fluid cavity therebetween such that the back plate is in contact with the fluid. The motor assembly further includes a stator assembly coupled to the back plate and positioned opposite the second fluid cavity such that the fluid facilitates cooling the stator assembly.

In another aspect, a motor assembly is provided. The motor assembly includes a hollow shaft defining a first fluid cavity configured to receive a fluid therein and a motor housing including a back plate that at least partially defines a second fluid cavity. The motor assembly also includes a stator assembly coupled to the back plate and positioned opposite the second fluid cavity such that the fluid flow along the back plate facilitates cooling the stator assembly.

In yet another aspect, a method of assembling a pump assembly includes positioning an impeller within a fluid channel defined by a pump housing. The impeller is configured to channel a fluid along the fluid channel between a fluid inlet and a fluid outlet, wherein the impeller includes a rear plate having an opening defined therein. The method further includes coupling a shaft of a motor assembly to the rear plate. The shaft defines a first fluid cavity coupled in flow communication with the opening to enable fluid flow into the shaft. A motor housing is positioned relative to the impeller rear plate to define a second fluid cavity therebetween such that the back plate is in contact with the fluid. The method also includes coupling a stator assembly to the back plate opposite the second fluid cavity such that the fluid facilitates cooling the stator assembly.

Although specific features of various embodiments may be shown in some drawings and not in others, this is for convenience only. Any feature of any drawing may be referenced and/or claimed in combination with any feature of any other drawing.

DETAILED DESCRIPTION

Figure 1:
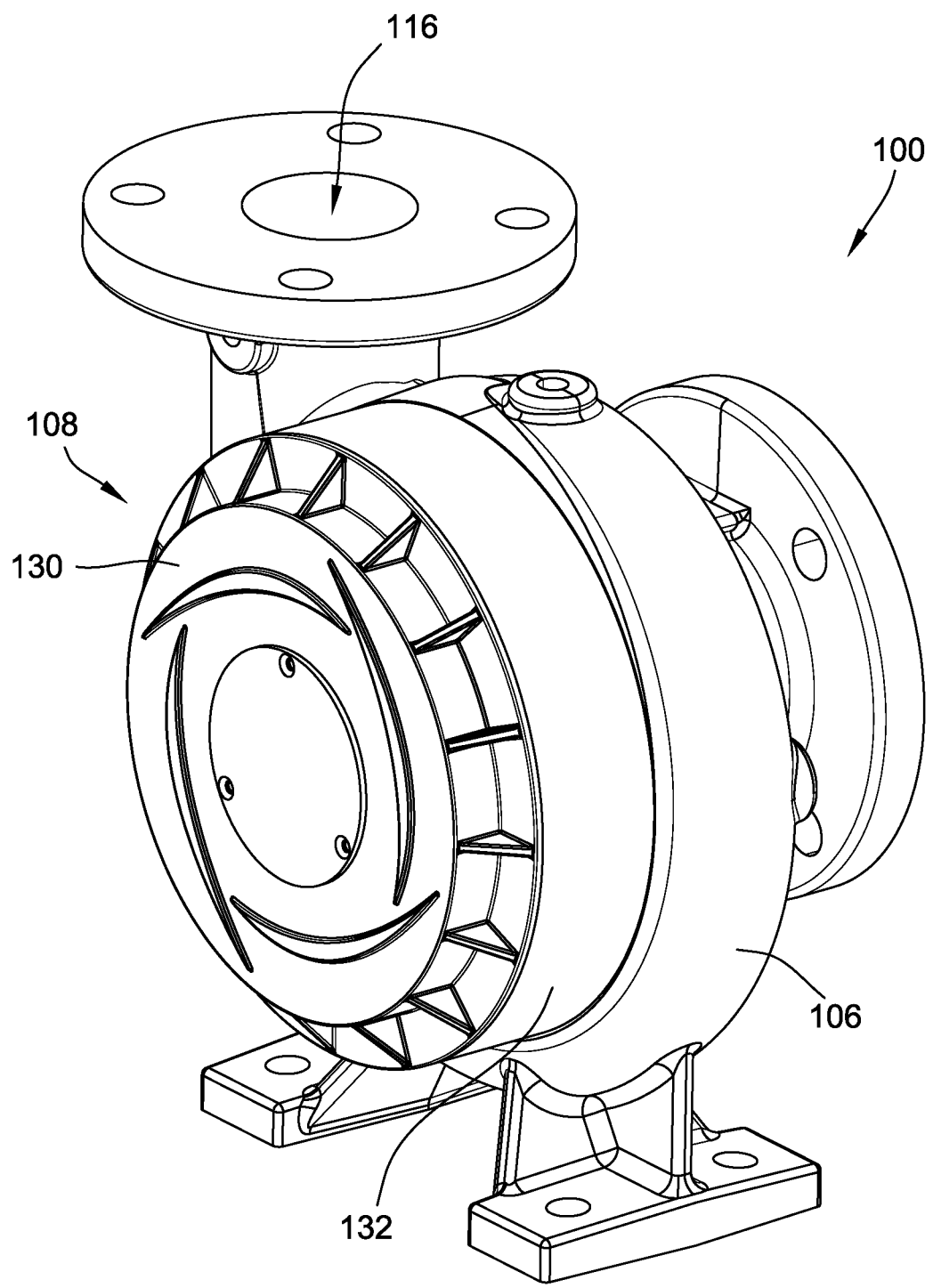
FIG. 1 is a perspective view of an exemplary centrifugal pump.
Figure 2:
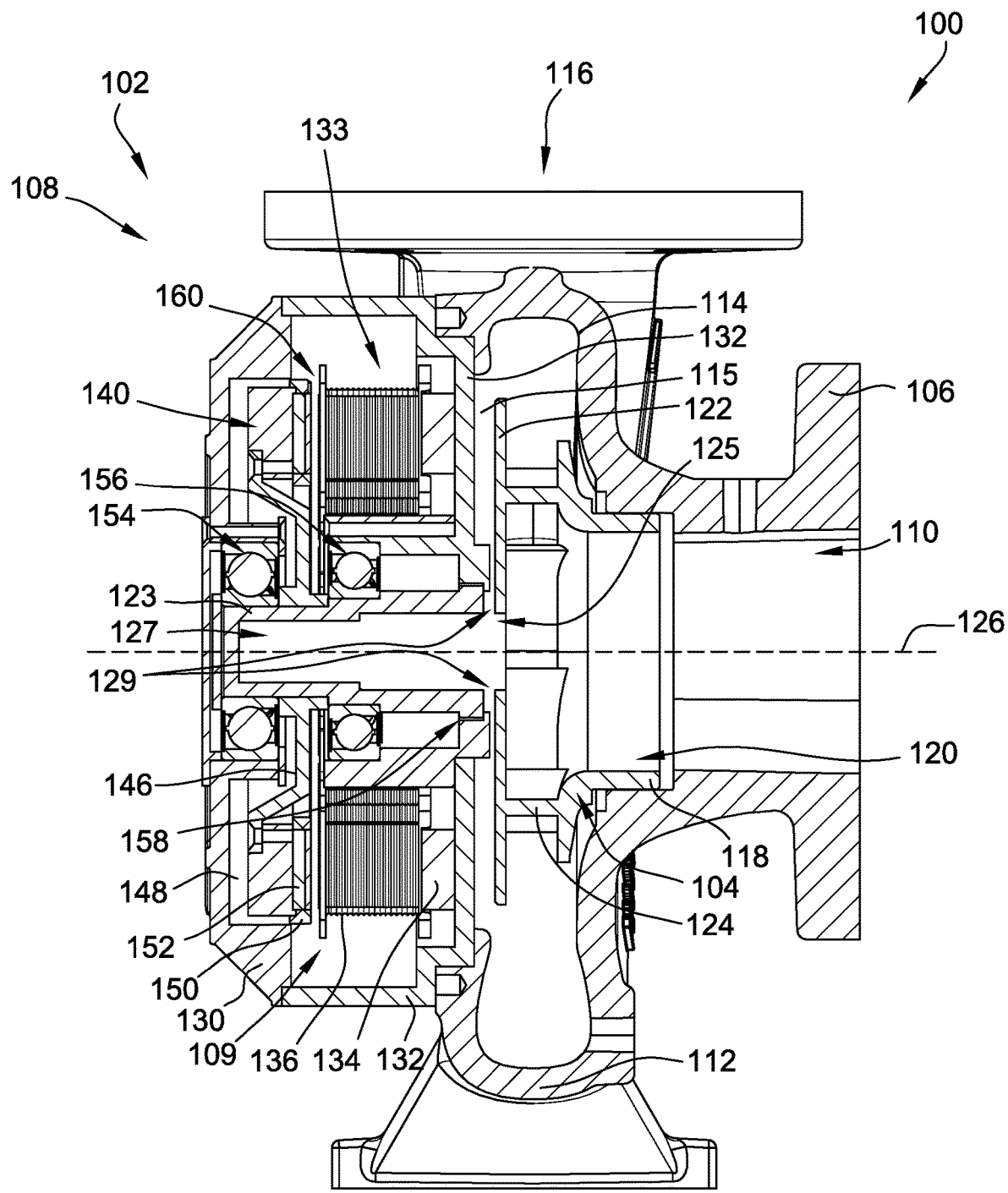
FIG. 2 is a cross-sectional view of the centrifugal pump shown in FIG. 1

FIG. 1 is a perspective view of an exemplary centrifugal pump assembly 100. FIG. 2 is a cross-sectional view of pump assembly 100 illustrating an axial flux electric motor assembly 102, an impeller 104, and a pump housing 106. In the exemplary embodiment, pump assembly 100 includes pump housing 106 and a motor housing 108. Pump housing 106 encloses impeller 104 and at least a portion of motor assembly 102, while motor housing 108 encloses motor assembly 102. Pump housing 106 includes a fluid inlet 110, a scroll wall 112 defining a portion of a fluid flow channel 114, and a fluid outlet 116. In operation, fluid flows through inlet 110 and is directed through channel 114 around wall 112 until the fluid exits pump 100 through housing outlet 116.

In the exemplary embodiment, impeller 104 is positioned within pump housing 106 and includes an inlet ring 118 that defines an inlet opening 120. Impeller 104 also includes a rear plate 122 and a plurality of blades 124 coupled between inlet ring 118 and rear plate 122. In operation, motor 102 rotates impeller 104 about axis 126 to draw fluid in an axial direction into pump housing 106 through housing inlet 110. The fluid is channeled through inlet opening 120 in inlet ring 118 and turned by blades 124 within channel 114 to direct the fluid along wall 112 and radially through housing outlet 116. The amount of fluid moved by pump assembly 100 increases as impeller 104 speed increases such that impeller 104 generates high velocity fluid flow that is exhausted from outlet 116.

In the exemplary embodiment, motor assembly 102 includes motor housing 108 including a cover plate 130 and a back plate 132. More specifically, back plate 132 is positioned proximate rear plate 122 of impeller 104 to define a fluid cavity 115 therebetween such that back plate 132 is in contact with the fluid within cavity 115. Motor assembly 102 also includes a stator assembly 133 positioned proximate back plate 132 and including a magnetic stator core 134 and a plurality of conductor coils 136. Each conductor coil 136 includes an opening (not shown) that closely conforms to an external shape of one of a plurality of stator core teeth 142 such that each stator tooth 142 is configured to be positioned within a conductor coil 136. Motor assembly 102 may include one conductor coil 136 per stator tooth 142 or one conductor coil 136 positioned on every other tooth 142. Stator core 134 and coils 136 are positioned within back plate 132 of motor housing 108, which is coupled to pump housing 106 with a plurality of fasteners 144.

In the exemplary embodiment, a variable frequency drive (not shown) provides a signal, for example, a pulse width modulated (PWM) signal, to motor 102. In an alternative embodiment, motor 102 may include a controller (not shown) coupled to conductor coils 136 by wiring. The controller is configured to apply a voltage to one or more of conductor coils 136 at a time for commutating conductor coils 136 in a preselected sequence to rotate a rotor assembly 140 about axis 126.

Rotor assembly 140 is positioned within motor housing 108 and includes a rotor hub 146, a rotor disk 148 coupled to hub 146, a magnet retainer 150 coupled to rotor hub 146 and rotor disk 148, and a plurality of permanent magnets 152 coupled to rotor disk 148 and/or magnet retainer 150 using an adhesive. Alternatively, magnets 152 may be coupled to magnet retainer 150 using any retention method that facilitates operation of motor 102 as described herein. In another embodiment, magnets 152 are coupled directly to rotor disk 146.

Motor assembly 102 also includes a first bearing assembly 154, a second bearing assembly 156, and a seal assembly 158. In the exemplary embodiment, rotor assembly 140, first bearing assembly 154, second bearing assembly 156, and seal assembly 158 are all coupled to a shaft 123 that extends from, and is coupled to, rear plate 122 of impeller 104 toward motor assembly 102. More specifically, seal assembly 158 is coupled between shaft 123 and back plate 132 of motor housing 108 to prevent fluid ingress into motor assembly 102. Rear plate 122 includes an opening 125 that is in flow communication with a fluid cavity 127 defined by hollow shaft 123 to enable fluid flow into shaft 123. Additionally, shaft 123 includes at least one aperture 129 defined therethrough and positioned proximate rear plate 122 of impeller 104. In the exemplary embodiment, shaft 123 includes a plurality of apertures 129. Apertures 129 provide an outlet for the fluid within fluid cavity 127 to allow for re-circulation of the fluid within shaft 123. Such re-circulation provides further cooling to shaft 123, stator assembly 133, bearing assembles 154 and 156, and seal assembly 158.

In the exemplary embodiment, rotor assembly 140 is positioned adjacent stator assembly 133 to define an axial gap 160 therebetween. As described above, voltage is applied to coils 136 in sequence to cause rotation of rotor assembly 140. More specifically, coils 136 control the flow of magnetic flux between magnetic stator core 134 and permanent magnets 152.

In operation, conductor coils 136 coupled to stator core 134 are energized in a chronological sequence that provides an axial magnetic field which moves clockwise or counter-clockwise around stator core 134 depending on the predetermined sequence or order in which conductor coils 136 are energized. This moving magnetic field intersects with the flux field created by the plurality of permanent magnets 152 to cause rotor assembly 140 to rotate about axis 126 relative to stator assembly 133 in the desired direction. Rotation of rotor assembly 140 facilitates rotation of shaft 123, which then facilitates rotation of impeller 104.

During standard operation, each of conductor coils 136, bearing assemblies 154 and 158, and an electronics module (not shown) positioned proximate motor housing 108 generate heat that may require cooling to prevent conductor coils 136, bearing assemblies 154 and 158, and the electronics module from exceeding a predetermined temperature limit. In the exemplary embodiment, stator assembly 133 is positioned within motor housing 108 and coupled to back plate 132. More specifically, conductor coils 136 of stator assembly 133 are positioned opposite back plate 132 from fluid cavity 115. As described above, the relatively cool fluid flows along back plate 132 such that the temperature of back plate 132 is reduced. The cooled back plate 132 reduces the temperature of a motor cavity 109 within motor casing 108, which facilitates cooling conductor coils 136 within cavity 109. The close proximity of conductor coils 136 within motor cavity 109 to the fluid within fluid cavity 115 of pump housing 106 facilitates reducing the temperature of conductor coils 136.

Similarly, in operation of motor assembly 102, bearing assemblies 154 and 156 generate heat through friction and may also benefit from being cooled. As described above, bearing assemblies 154 and 156 are coupled about hollow shaft 123. As impeller 104 rotates, at least some fluid will flow through opening 125 in rear plate 122 and enter into fluid cavity 127 defined by shaft 123. The relatively cool fluid flows into cavity 127 and along an inner surface of shaft 123 such that the temperature of shaft 123 is reduced. The cooled shaft 123 absorbs heat from bearing assembles 154 and 156 and transfers the heat to the fluid within cavity 127. As such, the close proximity of bearing assemblies 154 and 156 to the fluid within fluid cavity 127 of shaft 123 facilitates reducing the temperature of bearing assemblies 154 and 156.

Furthermore, as described herein, apertures 129 in shaft 123 provide an outlet through which fluid within fluid cavity 127 can exit shaft 123. The rotation of shaft 123 naturally causes the fluid within fluid cavity 127 against the inner surfaces of shaft and out apertures 129. As such, the fluid within fluid cavity 127 exits shaft 123 through apertures 129 and not through opening 125, where additional cooling fluid is entering fluid cavity 127. Specifically, the fluid flow exits shaft 123 through apertures 129 and flows into fluid cavity 115 to further cool back plate 132 and coils 136. Accordingly, the fluid entering shaft 123 through opening 125 circulates around fluid cavity 127 within shaft 123 and then exits shaft 123 through apertures 129 to flow through fluid cavity 115, and then finally into channel 114 and out through outlet 116.

Additionally, cover plate 130 of motor housing 108 is removable from back plate 132 to allow access to motor cavity 109 without requiring removal of motor assembly 102 from pump housing 106. Specifically, cover plate 130 can be removed to access components of motor assembly 102 that may require servicing. For example, cover plate 130 can be removed to access bearing assemblies 154 and 156 and/or seal assembly 158 for servicing or replacement without removing back plate 132 of motor housing 108 from pump housing 106.

The apparatus, methods, and systems described herein provide a pump assembly including a pump housing having a fluid inlet, a fluid outlet, and a fluid channel defined therebetween. The pump assembly also includes an impeller positioned within the fluid channel and including a rear plate having an opening defined therein. A shaft is coupled to the rear plate, wherein the shaft defines a first fluid cavity coupled in flow communication with the opening to enable fluid flow into the shaft. The pump assembly also includes a motor assembly including a motor housing having a back plate and a removable cover plate. The back plate is positioned relative to the impeller rear plate to define a second fluid cavity therebetween such that the back plate is in contact with the fluid. The motor assembly also includes a stator assembly coupled to the back plate and positioned opposite the second fluid cavity such that the fluid facilitates cooling the stator assembly. A bearing assembly of the motor assembly is coupled to the shaft, wherein the fluid within the first fluid cavity facilitates cooling the bearing assembly. A seal assembly of the motor assembly is coupled between the shaft and the motor housing. The cover plate is removable to provide access to the bearing assembly and the seal assembly without removing the motor assembly from the pump housing.

Exemplary embodiments of the centrifugal pump assembly are described above in detail. The centrifugal pump assembly and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A pump assembly comprising:
   a pump housing comprising a fluid inlet, a fluid outlet, and a fluid channel defined therebetween;
   an impeller positioned within said fluid channel and configured to channel a fluid between said fluid inlet and said fluid outlet, wherein said impeller comprises a rear plate having an opening defined therein; and
   a motor assembly comprising:
      a shaft coupled to said rear plate, wherein said shaft defines a first fluid cavity coupled in flow communication with the opening to enable fluid flow into said shaft, and wherein said shaft terminates at said rear plate such that said rear plate opening is free of said shaft;
      a motor housing comprising a back plate positioned relative to said impeller rear plate to define a second fluid cavity therebetween such that said back plate is in contact with the fluid, wherein said shaft comprises at least one aperture defined therethrough and axially aligned with the second fluid cavity, said at least one aperture configured to channel the fluid from said first fluid cavity to the second fluid cavity, wherein said at least one aperture is radially oriented; and
      a stator assembly coupled to said back plate and positioned opposite the second fluid cavity such that the fluid facilitates cooling said stator assembly.

2. The pump assembly of claim 1, wherein said at least one aperture is defined through said shaft proximate said rear plate.

3. The pump assembly of claim 1, wherein said at least one aperture facilitates circulation of the fluid through the first fluid cavity.

4. The pump assembly of claim 1, wherein said motor assembly further comprises at least one bearing assembly coupled to said shaft, wherein the fluid within the first fluid cavity facilitates cooling said at least one bearing assembly.

5. The pump assembly of claim 4, wherein said motor assembly further comprises a cover plate coupled to said back plate opposite said impeller, wherein said cover plate is removable to provide access to said at least one bearing assembly without removing said motor assembly from said pump housing.

6. The pump assembly of claim 1, wherein the motor assembly further comprises:
   a cover plate coupled to said back plate opposite said impeller; and
   a seal assembly coupled between said shaft and said back plate, wherein said cover plate is removable to provide access to said seal assembly without removing said back plate from said pump housing.

7. The pump assembly of claim 6, wherein the motor assembly further comprises at least one bearing assembly coupled to said shaft, wherein said cover plate is removable to provide access to said at least one bearing assembly without removing said motor assembly from said pump housing.

8. A pump assembly comprising:
   an impeller configured to channel a fluid, wherein said impeller comprises a rear plate having an opening defined therein;
   a hollow shaft defining a first fluid cavity configured to receive the fluid therein;
   a motor housing comprising a back plate that at least partially defines a second fluid cavity, wherein said shaft comprises at least one aperture defined therethrough and axially aligned with the second fluid cavity, said at least one aperture configured to channel the fluid from said first fluid cavity to the second fluid cavity, wherein said at least one aperture is radially oriented, and wherein fluid flows sequentially through said rear plate opening and into said first fluid cavity; and
   a stator assembly coupled to said back plate and positioned opposite the second fluid cavity such that the fluid flow along said back plate facilitates cooling said stator assembly.

9. The pump assembly of claim 8, wherein the at least one aperture is positioned proximate an inlet to the first fluid cavity.

10. The pump assembly of claim 8, wherein the at least one aperture facilitates circulation of the fluid through the first fluid cavity.

11. The pump assembly of claim 8, further comprising at least one bearing assembly coupled to said shaft, wherein the fluid within the first fluid cavity facilitates cooling said at least one bearing assembly.

12. The pump assembly of claim 11, further comprising a cover plate coupled to said back plate, wherein said cover plate is removable to provide access to said at least one bearing assembly.

13. The pump assembly of claim 8, further comprising:
   a cover plate coupled to said back plate; and
   a seal assembly coupled between said shaft and said back plate, wherein said cover plate is removable to provide access to said seal assembly.

14. The pump assembly of claim 13, further comprising at least one bearing assembly coupled to said shaft, wherein said cover plate is removable to provide access to said at least one bearing assembly.

15. A method of assembling a pump assembly, said method comprising:
   positioning an impeller within a fluid channel defined by a pump housing, the impeller configured to channel a fluid along the fluid channel between a fluid inlet and a fluid outlet, wherein the impeller includes a rear plate having an opening defined therein;
   coupling a shaft of a motor assembly to the rear plate, wherein the shaft defines a first fluid cavity coupled in flow communication with the opening to enable fluid flow into the shaft, and wherein the shaft terminates at the rear plate such that the rear plate opening is free of the shaft;
   positioning a motor housing of the motor assembly relative to the impeller rear plate to define a second fluid cavity therebetween such that a back plate is in contact with the fluid, wherein the shaft includes at least one aperture defined therethrough and axially aligned with the second fluid cavity, the at least one aperture configured to channel the fluid from the first fluid cavity to the second fluid cavity, wherein said at least one aperture is radially oriented; and
   coupling a stator assembly to the back plate opposite the second fluid cavity such that the fluid facilitates cooling the stator assembly.

16. The method of claim 15, further comprising:
   coupling at least one bearing assembly to the shaft, wherein the fluid within the first fluid cavity facilitates cooling the at least one bearing assembly.

17. The method of claim 16, further comprising:
   coupling a seal assembly between the shaft and the back plate; and
   removably coupling a cover plate to the back plate opposite the impeller, wherein the cover plate is removable to provide access to the at least one bearing assembly and the seal assembly without removing the back plate from the pump housing.

* * * * *